United States Patent [19]

Lee

[11] Patent Number: 5,295,006
[45] Date of Patent: Mar. 15, 1994

[54] OPTICAL EXPOSURE SYSTEM FOR COLOR VIDEO PRINTER WITH LIGHT SOURCE MOVING ALONG ROD BEHIND THREE COLOR LIQUID CRYSTAL PANELS

[75] Inventor: Kwang J. Lee, Seoul, Rep. of Korea

[73] Assignee: Goldstar Co., Ltd., Seoul, Rep. of Korea

[21] Appl. No.: 894,831

[22] Filed: Jun. 8, 1992

[30] Foreign Application Priority Data

Jun. 7, 1991 [KR] Rep. of Korea ................ 9404/1991

[51] Int. Cl.$^5$ ................ G02F 1/1335; G02F 1/1333; G03B 27/80; G01D 9/00
[52] U.S. Cl. .................................. 359/49; 359/36; 359/83; 355/38; 355/326 R; 355/327; 346/160
[58] Field of Search .................. 359/36, 49, 68, 83; 355/38, 326, 327; 346/160; 358/75, 80

[56] References Cited

U.S. PATENT DOCUMENTS

| | | | |
|---|---|---|---|
| 3,574,456 | 4/1971 | Grace | 355/326 |
| 3,936,172 | 2/1976 | McVeigh | 355/326 |
| 5,047,789 | 9/1991 | Kanayama et al. | 359/68 |
| 5,105,281 | 4/1992 | Kusaka | 346/107 R |
| 5,115,270 | 5/1992 | Kraft et al. | 355/38 |
| 5,144,464 | 9/1992 | Ohnishi et al. | 359/68 |

*Primary Examiner*—William L. Sikes
*Assistant Examiner*—Anita Pellman Gross

[57] ABSTRACT

An exposure system for a color video printer capable of obtaining a uniform exposing to liquid crystal display panels for red, green and blue colors by common use of a light source being movably disposed. The exposure system includes liquid crystal display panels for red, green and blue colors disposed at an upper portion of a casing so as light being incident thereupon not to be interfered with each other, a light source for illuminating the liquid crystal display panels, a light source supporting and light-reflecting member being movable in the casing for containing the light source therein and reflecting the light toward only a desired panel, and a driving member for moving right and left the light source supporting and light-reflecting member.

6 Claims, 5 Drawing Sheets

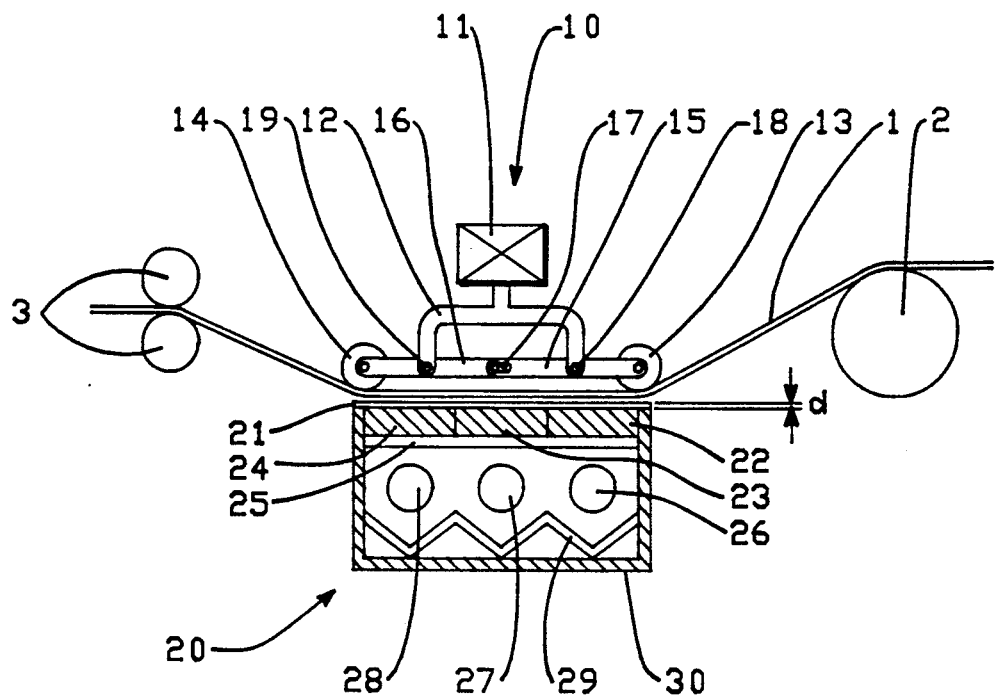
(PRIOR ART)
FIG.—1A
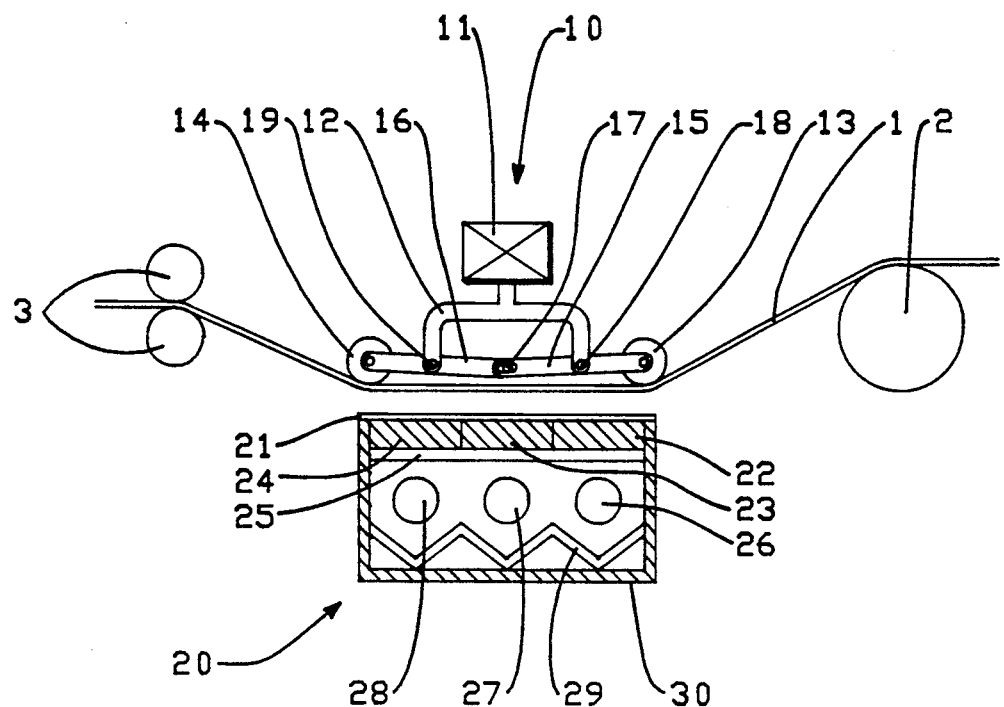
(PRIOR ART)
FIG.—1B

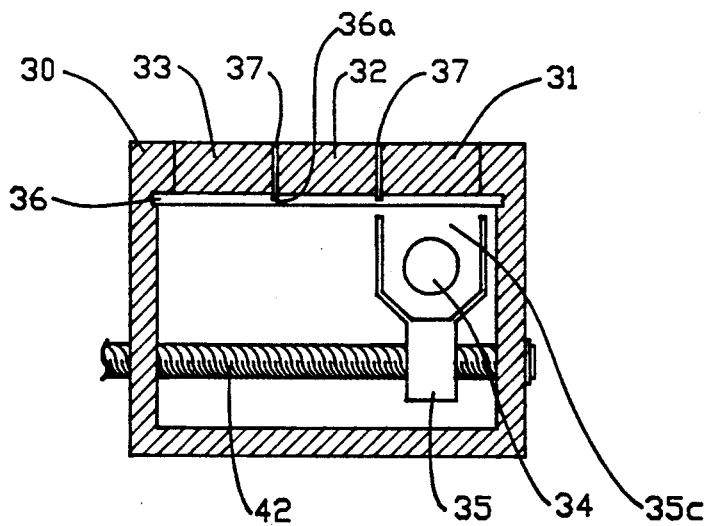
FIG.—5A
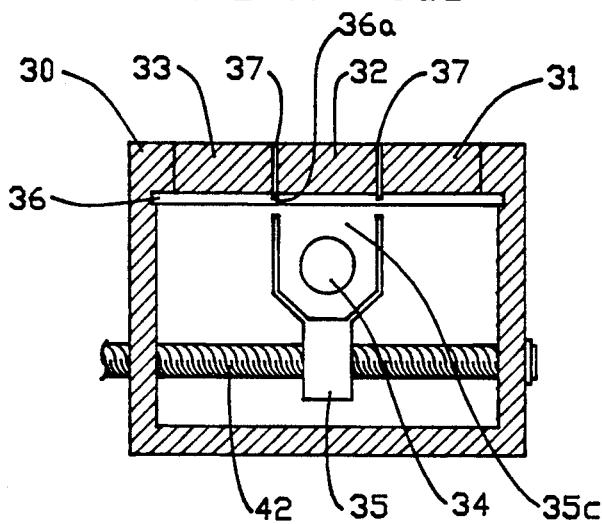
FIG.—5B
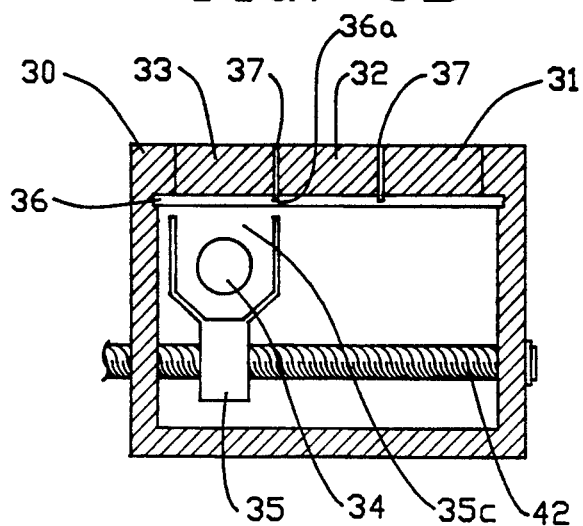
FIG.—5C

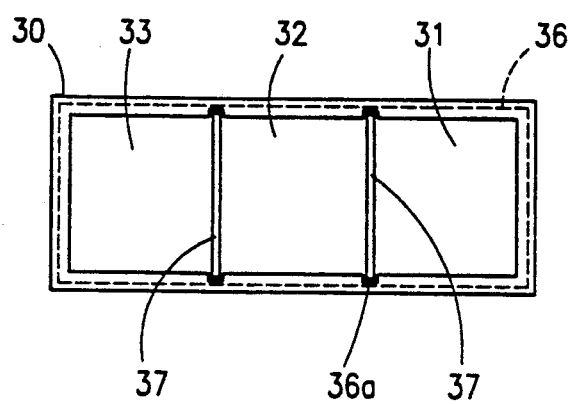
FIG.—6

OPTICAL EXPOSURE SYSTEM FOR COLOR VIDEO PRINTER WITH LIGHT SOURCE MOVING ALONG ROD BEHIND THREE COLOR LIQUID CRYSTAL PANELS

BACKGROUND OF THE INVENTION

1. Field of the Invention

The present invention relates to an optical exposure system for a color video printer utilizing a liquid crystal display device (hereinafter, referred to as a "LCD") and more particularly, to an optical exposure system for a color video printer which is capable of obtaining a uniform irradiation of light with respect to red, green and blue LCD panels.

2. Description of the Prior Art

In general, various types of exposure systems for converting an electrical image into an optical image and exposing the optical image to a photosensitive medium are well known in the art. Recently, exposure systems utilizing a liquid crystal display television technique are widely used.

In such an exposure system, there has been involved some problems in that it takes relatively many times in the exposing procedure, thereby causing the printing operation not to be carried out quickly.

To obviate such a problem, the applicant of this invention has filed a Korean Patent Application No. 5794/1991 entitled "An Exposure System for a Color Video Printer", in which an exposing unit using liquid crystal display panels for red, green and blue colors having the same size as a screen is provided. In this exposure system, the exposing operation is sequentially carried out for red, green and blue colors while moving a photosensitive medium over the liquid crystal display panels so that the printing time is reduced and the high picture resolution may be obtained.

The exposure system mentioned-above is illustrated in FIGS. 1 to 3, which comprises a casing 30, liquid crystal display panels 22, 23 and 24 for red, green and blue colors disposed at the upper portion of the casing 30 and commensurate with a screen, a liquid crystal exposure unit 20 including light sources 26, 27 and 28 each for radiating a light to each of the liquid crystal display panels 22, 23 and 24, and a photosensitive medium supporting unit 10 disposed on the liquid crystal display pannels 22, 23 and 24 for directing the photosensitive medium which is transferred from a supply roll 2 to take-up rolls 3 and 3' to be in spaced with the liquid crystal display panels 22, 23 and 24 at a predetermined gap (d).

The exposure unit 20 is constituted such that a transparent support member 25 is fixed at the upper inner part of the casing 30 and on the transparent support member 25, the liquid crystal display panels 22, 23 and 24 are positioned. On the upper surface of the panels 22, 23 and 24, a transparent spacer member 21 is disposed. At the lower side of the liquid crystal display panels 22, 23 and 24, light sources 26, 27 and 28 and a reflective plate 29 for reflecting a light from the light sources 26, 27 and 28 toward the panels 22, 23 and 24 are disposed.

The photosensitive medium supporting unit 10 includes a solenoid 11, a support bar 12 operably connected to the solenoid 11 and provided with lower extensions, a pair of lever members 15 and 16 connected at one ends thereof to each other by means of a pin 17 and at other ends thereof to the lower extensions of the support bar 12 by means of connecting pins 18 and 19, and a pair of rolls 13 and 14 mounted to outer ends of the lever members 15 and 16 for pressing the photosensitive medium 1 against the upper surface of the transparent spacer member 21 so that the lever members 15 and 16 may be rotated upwardly about the pin 17 and the rolls 13 and 14 may be moved left or right, thereby causing the photosensitive medium 1 to be in close contact with the transparent spacer member 21 in the exposing operation or to be spaced apart from the spacer member 21 when the exposing operation is not carried out.

Hereinafter, the operation of the conventional exposure system will be described.

When the photosensitive medium 1 is located over the liquid crystal display panel 22 for red color by the operation of the supply roll 2 and the take-up rolls 3 and 3' and then a signal voltage for red color is applied to the liquid crystal display panel 22 for red color and the light source 26 is turned on, as shown in FIG. 3A, an optical image is formed in accordance with the red color signal and the optical image is irradiated to the photosensitive medium 1. At this moment, it takes, in general, about 5-15 seconds in the above-mentioned procedures.

Upon completion of the exposing operation for red color, the light source 26 is turned off and the photosensitive medium 1 is transferred ever the liquid crystal display panel 23 for green color, as shown in FIG. 3B, by means of the supply roll 2 and the take-up rolls 3 and 3'. Then, the liquid crystal display panel 23 for green color is driven by a green color signal voltage and the light source 27 is turned on so that a green color image is formed to expose the portion that the red color image has been exposed on the photosensitive medium 1.

Thereafter, the exposing operation for blue color is also carried out in the same manner as described above.

In such an exposing operation, the solenoid 11 is turned off so that the supporting bar 12 descends, thereby the lever members 15 and 16 are pressed down about the connecting pin 17. As a result, the rolls 13 press down the photosensitive medium 1 against the transparent spacer member 21 throughout the whole surface. Thus, a gap (d) which is a thickness of the spacer member 21 is maintained between the photosensitive medium 1 and the panels 22, 23 and 24 throughout the whole surface.

On the other hand, upon completion of the exposing operations, the solenoid 11 is turned on to pull upwardly the supporting bar 12 so that the rolls 13 and 14 are raised up, thereby allowing the photosensitive medium 1 to be easily transferred without any friction.

In such a conventional exposure system for a color video printer, although it is possible to shorten the time required in the exposing operation and to obtain a high resolution by use of liquid crystal display panels commensurate with the whole screen, there have been involved some problems in that since the light sources are fixed in their positions, the number of the light sources are increased in proportion to the size of the screen in case that the screen has a large size.

Moreover, since the distribution of the light which is irradiated directly and indirectly to the liquid crystal display panels for red, green and blue colors are not uniform, the picture quality becomes deteriorated. In addition, the light from the light sources are not irradiated to a desired liquid crystal display panel but to all the panels, so that a light loss occurs and also an unnecessary exposing may be carried out to the photosensitive medium by a light which has been irradiated to other panels.

SUMMARY OF THE INVENTION

Accordingly, it is an object of the present invention to provide an exposure system for a color video printer which is capable of using commonly a light source for red, green and blue colors.

Another object of the present invention is to provide an exposure system for a color video printer which is capable of enhancing an exposure uniformity and avoiding an unnecessary exposing by virtue of the common use of light source.

Other objects and further scope of applicability of the present invention will become apparent from the following detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

Briefly described, the present invention relates to an exposure system for a color video printer which comprises a casing, liquid crystal display panels each for red, green and blue lights disposed at an upper portion of the casing, a light source for radiating a light to the panels, a light source supporting and light-reflecting member being movably disposed within the casing for supporting the light source and focusing a light from the light source so as the light from the light source to be irradiated only to a desired liquid crystal display panels, and a driving member for moving the light source supporting and light-reflecting member in the left or right.

The driving member includes a guide rod and a threaded rod both being disposed symmetrically at side walls of the casing and inserted into a guide hole and a threaded hole, respectively, formed at a lower portion of the light source supporting and light-reflecting member, and a motor for rotating the threaded rod.

The light source supporting and light-reflecting member includes at its upper portion an opening commensurate with each of the liquid crystal display panels.

The liquid crystal display panels are disposed on a glass plate located at an upper inner portion of the casing and between the red panel and the green panel and between the green panel and the blue panel, light-cutoff layers are provided, respectively.

BRIEF DESCRIPTION OF THE DRAWINGS the present invention will become more fully understood from the detailed description given hereinbelow and the accompanying drawings which are given by way of illustration only, and thus are not limitative of the present invention, and wherein:

FIGS. 1A and 1B are longitudinal sectional view showing the configuration and operation of a conventional exposure system for a color video printer, in which:

FIG. 1A is a view showing the exposure system in the exposing operation; and

FIG. 1B is the same view as FIG. 1A, but in transferring a photosensitive medium;

FIGS. 3A to 3C are explanatory views showing the operation of the exposing unit of the conventional color video printer, in which:

FIG. 3A is a view for illustrating the exposing operation for red color;

FIG. 3B is a view for illustrating the exposing operation for green color; and

FIG. 3C is a view for illustrating the exposing operation for blue color;

FIGS. 5A to 5C are longitudinal sectional views showing the operation of the exposure system of the present invention, in which:

FIG. 5A is a view for illustrating the exposing operation for red color;

FIG. 5B is a view for illustrating the exposing operation for green color; and

FIG. 5C is a view for illustrating the exposing operation for blue color; and

FIG. 6 is an explanatory view illustrating the fixing manner of a light-cutoff layer of the exposure system of the present invention.

DESCRIPTION OF THE PREFERRED EMBODIMENTS

Figure 2:
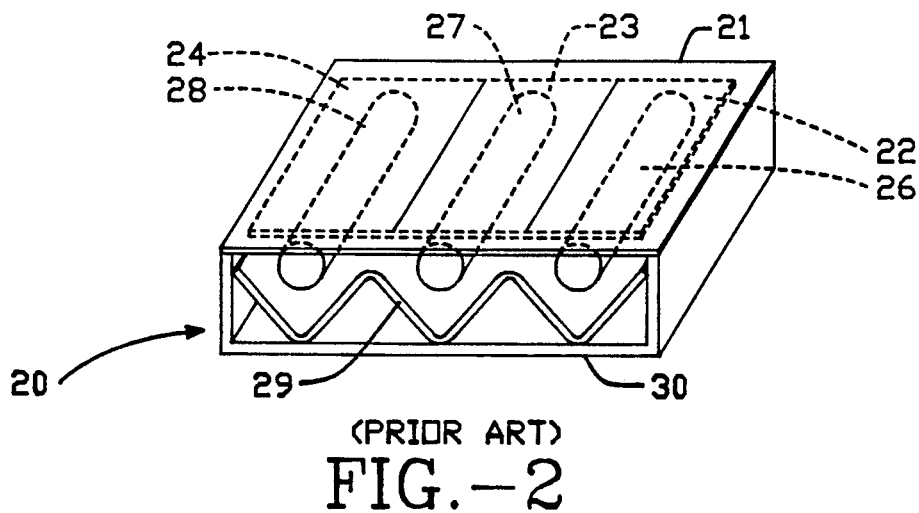
FIG. 2 is a perspective view of a liquid crystal exposure unit of the conventional color video printer.
Figure 3A:
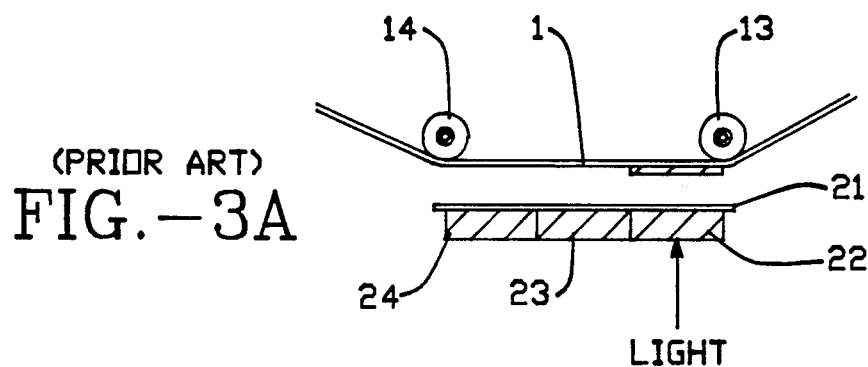
Figure 3B:
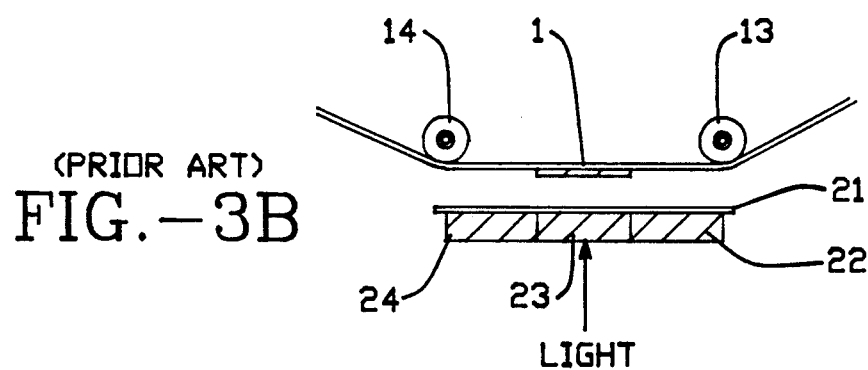
Figure 3C:
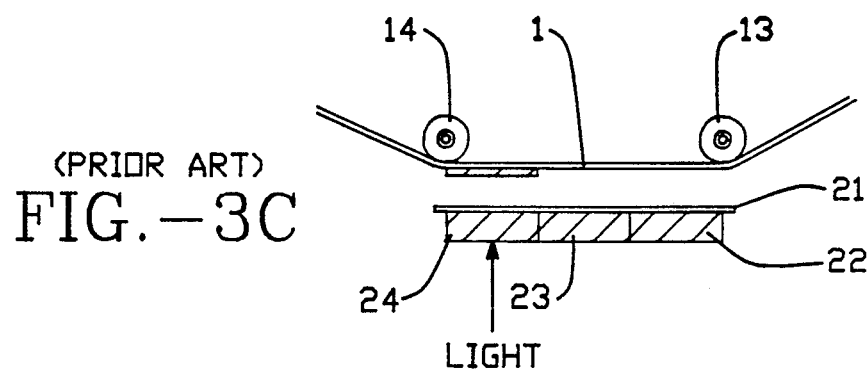
Figure 4:
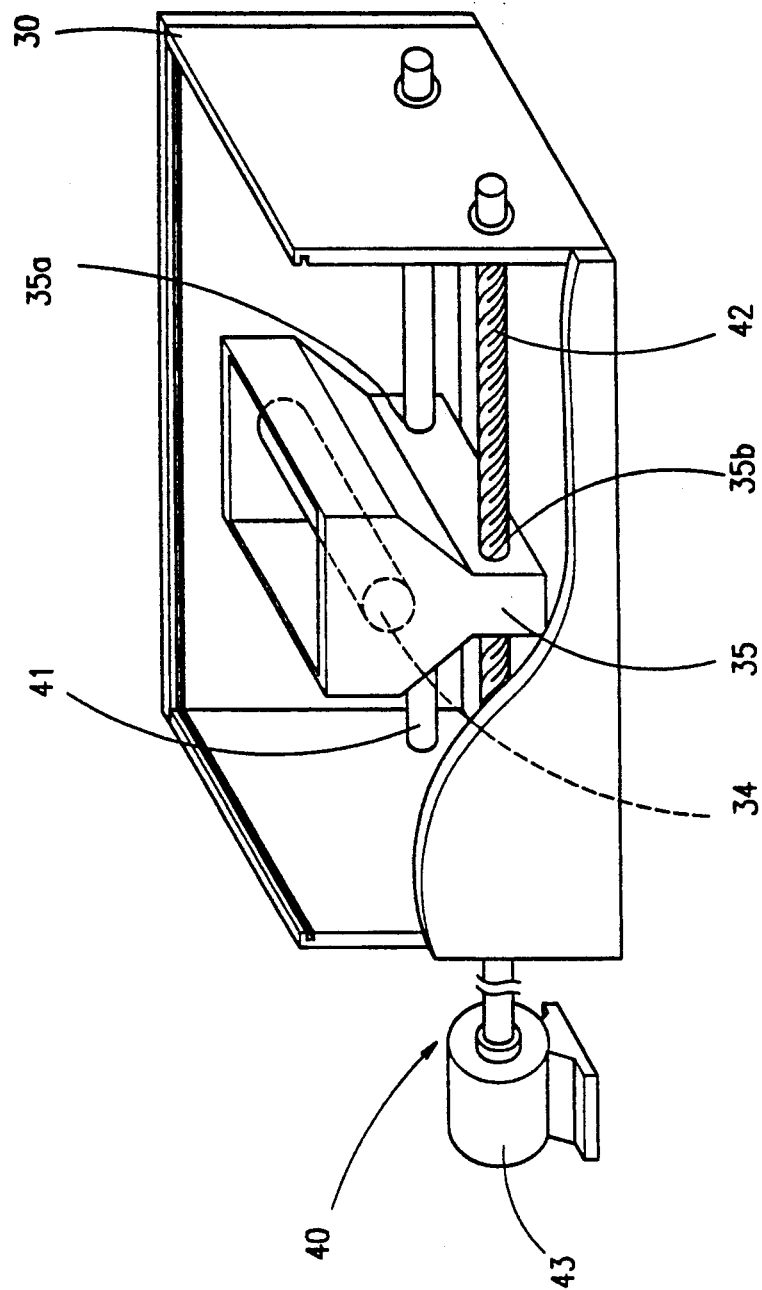
FIG. 4 is a perspective view showing the exposure system for a color video printer according to the present invention.

Referring now in detail to the drawings for the purpose of illustrating preferred embodiments of the present invention, the exposure system for a color video printer as shown in FIGS. 4 to 6, comprises a casing 30, liquid crystal display panels 31, 32 and 33 for red, green and blue colors disposed at an upper portion of the casing 30 so as the light not to be interfered with each other, a light source 34 disposed below the liquid crystal display panels 31, 32 and 33 for radiating a light to the panels 31, 32 and 33, a light source supporting and light-reflecting member 35 movably disposed within the casing 30 for supporting the light source 34 and for focusing and reflecting a light from the light source 34 so that the light may be irradiated only to a desired panel among the liquid crystal display panels 31, 32 and 33, and a driving member 40 for moving the light source supporting and light-reflecting member 35.

In addition, at the upper inner portion of the casing 30, a transparent glass plate 36 is horizontally fixed on which the liquid crystal display panels 31, 32 and 33 are disposed, and between the liquid crystal display panels 31 and 32 for red and green colors and between the liquid crystal display panels 32 and 33 for green and blue colors, light-cutoff layers 37 are provided, respectively.

As for the light-cutoff layers 37, plastic or steel plate may be used which is coated at its surface with black layers so as to absorb a light.

The light-cutoff layers 37 are fixed by a manner that their lower ends are inserted in fixing grooves 36a formed on the glass plate 36, as shown in FIG. 6.

The light source supporting and light-reflecting member 35 includes an opening 35c commensurate with each of the liquid crystal display panels 31, 32 and 33 and extended toward the glass plate 36. the inner surface of the light source supporting and light-reflecting member 35 is surface-treated so as to reflect a light.

The light source 34 is disposed within the opening 35c of the light source supporting and light-reflecting member 35.

The driving member 40 includes a guide rod 41 and a threaded rod 42 disposed horizontally within the casing 30 and inserted in a guide hole 35a and a threaded hole 35b, respectively, formed at the lower portion of the light source supporting and light-reflecting member 35, and a motor 43 for rotating the threaded rod 42.

The exposure system for a color video printer of the present invention operates as follows:

When a red color light is to be exposed, the light source supporting and light-reflecting member 35 is located below the liquid crystal display panel 31 for red color and a photosensitive medium is located over the liquid crystal display panel 31 for red color. Then, the liquid crystal display panel 31 for red color is driven by a red color drive signal and the light source 34 is driven so that an optical image is formed in response to the red color drive signal, thereby carrying out an exposing operation for red color with respect to the photosensitive medium.

At this moment, the light-cutoff layer 37 disposed between the liquid crystal display panels 31 and 32 for red and green colors prevents the light from the light source 34 from leaking to the liquid crystal display panel 32 for green color and the liquid crystal display panel 33 for blue color and also the light source supporting and light-reflecting member 35 focusingly reflects the light from the light source 34 toward only the liquid crystal display panel 31 for red color.

When the exposing operation for red color is finished, the light source supporting and light-reflecting member 35 is moved to the lower portion of the liquid crystal display panel 32 for green color with the light source 34 turned off by means of the drive motor 43 and at the same time the photosensitive medium is moved to the upper surface of the liquid crystal display panel 32 for green color. Then, the panel 32 is driven by a green color drive signal and the light source 34 is turned on so that an optical image is formed in response to the green color drive signal, thereby carrying out an exposing operation for green color with respect to the portion that the exposing for red color has been executed on the photosensitive medium.

At this moment, the light-cutoff layer 37 disposed between the liquid crystal display panels 32 and 33 for green and blue colors prevents the light emitted from the light source 34 from leaking to the liquid crystal display panels 31 and 33 for red and blue colors.

Similarly, upon completion of the exposing operation for red and green colors, the light source supporting and light-reflecting member 35 is moved to the lower side of the liquid crystal display panel 33 for blue color by means of the drive motor 43 with the light source turned on and at the same time the photosensitive medium is moved to the upper surface of the panel 33 for blue color. Then, the panel 33 is driven by a blue color drive signal and the light source 34 is turned on so that an optical image is formed in response to the blue color drive signal, thereby carrying out an exposing operation for blue color with respect to the portion that the exposing for red and green colors has been executed on the photosensitive medium.

In the above operation, the light source supporting and light-reflecting member 35 is linearly moved forward or rearward depending upon the rotation of the drive motor 43 through the action of the threaded rod 42 and the guide rod 41 operably coupled to the light source supporting and light-reflecting member 35.

As described above in detail, the present invention provides the effect that it is possible to reduce the cost for the backlight by common use of a single light source with respect to the three color elements. Also, the light source is driven under same condition with respect to red, green and blue color exposing operations so that the light distribution for the three colors are uniform, thereby improving the picture quality. In addition, since the leakage of light is prevented by use of the light-cutoff layer and the light-reflecting member, it is also possible to avoid an unnecessary exposing to the photosensitive medium.

The invention being thus described, it will be obvious that the same may be varied in many ways. Such variations are not to be regarded as a departure from the spirit and scope of the invention, and all such modifications as would be obvious to one skilled in the art are intended to be included in the scope of the following claims.

What is claimed is:

1. An optical exposure system for a color video printer, comprising:
    a casing;
    liquid crystal display panels each for red, green and blue colors disposed at an upper portion of the casing so that lights incident thereupon do not interfere with each other;
    a light source disposed below said liquid crystal display panels;
    a light source supporting and light-reflecting member disposed in a movable manner within the casing for supporting said light source and focusing and reflecting a light from the light source to one of the liquid crystal display panels; and
    driving means for moving said light source supporting and light-reflecting member.

2. The system of claim 1, wherein said liquid crystal display panels for red, green and blue lights are disposed on a glass plate located at an upper inner portion of the casing, and between the red and green panels and the green and blue panels, light-cutoff layers for cutting off a light are provided.

3. The system of claim 2, wherein each of said light-cutoff layers is fixed by inserting its lower ends in a groove formed on the glass plate.

4. The system of claim 1, wherein said light source supporting and reflecting member includes an opening commensurate with each of the liquid crystal display panels.

5. The system of claim 4, wherein said light source supporting and light-reflecting member includes an inner surface capable of reflecting a light from the light source.

6. The system of claim 1, wherein said driving means includes a guide rod and a threaded rod both being disposed symmetrically at side walls of the casing and inserted into a guide hole and a threaded hole, respectively, formed at a lower portion of the light source supporting and light-reflecting member, and a motor for rotating said threaded rod.

* * * * *